United States Patent [19]
Levine et al.

[11] Patent Number: 5,726,883
[45] Date of Patent: *Mar. 10, 1998

[54] METHOD OF CUSTOMIZING CONTROL INTERFACES FOR DEVICES ON A NETWORK

[75] Inventors: Jonathan D. Levine, Rochester; David M. Parsons, Victor, both of N.Y.

[73] Assignee: Xerox Corporation, Stamford, Conn.

[*] Notice: The term of this patent shall not extend beyond the expiration date of Pat. No. 5,604,860.

[21] Appl. No.: 540,435

[22] Filed: Oct. 10, 1995

[51] Int. Cl.$^6$ .................................................. G06F 3/00
[52] U.S. Cl. .......................... 364/188; 345/335; 345/357; 345/349; 345/970
[58] Field of Search .............................. 395/326–358, 395/200.1, 967, 970, 200.3; 364/188; 345/117–120, 146, 902, 326–358, 965

[56] References Cited

U.S. PATENT DOCUMENTS

| | | | |
|---|---|---|---|
| 4,711,560 | 12/1987 | Hosaka et al. | 355/14 C |
| 4,849,880 | 7/1989 | Bhaskar et al. | 395/349 X |
| 4,901,221 | 2/1990 | Kodosky et al. | 395/348 |
| 5,218,406 | 6/1993 | Ebner | 355/205 |
| 5,295,062 | 3/1994 | Fukushima | 395/349 X |
| 5,295,244 | 3/1994 | Dev et al. | 395/349 X |
| 5,428,730 | 6/1995 | Baker et al. | 395/806 |
| 5,448,695 | 9/1995 | Douglas et al. | 395/349 X |
| 5,455,903 | 10/1995 | Jolissaint et al. | 395/349 X |
| 5,475,851 | 12/1995 | Kodosky et al. | 395/967 X |
| 5,506,952 | 4/1996 | Choy et al. | 395/349 X |
| 5,513,126 | 4/1996 | Harkins et al. | 364/514 A |
| 5,537,630 | 7/1996 | Berry et al. | 395/349 X |
| 5,548,722 | 8/1996 | Jalalian et al. | 395/200.1 |
| 5,576,946 | 11/1996 | Bender et al. | 395/188 X |
| 5,602,997 | 2/1997 | Carpenter et al. | 395/349 |
| 5,604,860 | 2/1997 | McLaughlin et al. | 395/326 |

*Primary Examiner*—John E. Breene
*Attorney, Agent, or Firm*—Ronald F. Chapuran

[57] ABSTRACT

A method of storing and retrieving a customized interface control from a user display. The user display includes an array of pathway buttons and is interconnected to plural devices on a network. The method includes displaying and activating a job programming button to display programming options including save and save as options, engaging the save option to store the customized interface control in a general saved interface control category or store the customized interface control under a user defined reference. Included are techniques for expanding the features of selected machines on the network and creating selected multi-function operations not previously available.

10 Claims, 8 Drawing Sheets

FIG. 8A

| 272 — Devices... | 274 — Services... | 276 — Scripts... |
|---|---|---|

Copy — 278    Print — 280    282 — Fax

- [X] Copy Quantity
- [X] Sides Imaged
- [X] Copy Quality
- [ ] Image Shift
- [X] Reduce/Enlarge

- [X] Quantity
- [X] Sides Imaged
- [ ] Finishing
- [X] Collation

- [X] Dia
- [X] Qui
- [X] Dire
- [X] Res

FIG. 8B

| Devices... | Services... | Scripts... |
|---|---|---|

284 — Vendor #1 Device    286 — Vendor #2 Device

- [X] Copy Quantity
- [X] Sides Imaged
- [X] Copy Quality
- [ ] Image Shift

- [ ] Quantity
- [ ] Sides Imaged
- [ ] Finishing
- [ ] Collation
- [X] Reduce/Enlarge

- [X] Dia
- [X] Qui
- [X] Dire
- [X] Res
- [X] Col

METHOD OF CUSTOMIZING CONTROL INTERFACES FOR DEVICES ON A NETWORK

BACKGROUND OF THE INVENTION

The present invention relates to a user interface, in particular, to a simplified technique of creation, storage and access to multi-level customized control interfaces.

To meet modern document needs, document systems have been provided with ever expanding feature sets for various local and remote applications such as document copy, document distribution, document storage, and document printing. In the past, to expand feature sets, existing control panels were usually augmented with more menu layers, an increased number of categories of features, and increased numbers of buttons and icons. As a result, end user operators are often confronted with a control panel search task in order to locate and access the particular set of features and electronic dialogs needed for a particular job.

This has only aggravated job set up complexity for operators. The problem is further intensified when multi-functional features such as fax, print, store, and distribute are required. In these situations, users and operators are often confused on the availability of features and proper selection and combination of features to achieve a given job objective. A mass of dialog information and multiple options can bewilder an operator leading to erroneous selections. In particular, a machine site given to very specific requirements is not well served by a machine control panel that continually displays unneeded prompts, options and features. Also simple job requests don't need a multitude of features and options on a control panel to accomplish the job requirement.

U.S. Pat. No. 5,081,699, assigned to the same assignee as the present invention, discloses the storing of preprogrammed jobs in preprogramming slots in memory and also discloses the transfer of preprogrammed jobs to a floppy disk for transfer to another machine. This system, however, is directed to storing preprogrammed job requirements, that is, storing in memory a given job requirement such as number of documents, copy sheet size, inserts, duplex operation, exceptions to specific pages, and other features. Thus, whenever a job requires the exact requirements or features as stored, the job can be initiated just by accessing the program slot where the requirements are stored. Such a stored program is handy for repeated identical requirements or is helpful if only slight modifications need to be made to the requirements. However, this technique only applies to job requirements and selecting features already available to complete the job. This technique is not pertinent to creating control panels and procedures used in satisfying a job requirement.

U.S. Pat. No. 4,711,560 discloses a copier which functions according to a sequence control program stored on floppy disk and loaded by a user. U.S. Pat. No. 5,218,406 discloses the use of memory cards to transfer diagnostic procedures to a machine or store diagnostic data retrieved from the machine. A difficulty with the aforementioned systems, however, is that they are directed to loading job requirements or diagnostic procedures or data from an external memory.

On the other hand, the present invention is directed to an entirely different concept, the technique of fabricating and customizing the control panels or system for selecting the features to accomplish a given job requirement. It should be noted that pending application Ser. No. 329,811, (D/94101) filed Oct. 27, 1994 discloses a method of customizing and storing an interface control for a machine by entering an interface control customizing mode. This provides access to a library of control features for selecting a set of control features for use on a given machine and for arranging the set of control features in a given configuration on a scaled representation of an interface control. The set of control features and given configuration are referenced with a given identifier whereby upon accessing the identifier the set of control features and given configuration are provided on the interface control display.

A difficulty with this system however, is the limits of expandability and extension into third party device controls as well as limited feature expansion. Therefore, in the present invention, the control panels are tailored to meet not only a class of expected job requirements and the unique demands of a particular machine site, but also specific adaption of existing control panels or templates of machines of various vendors and creation of control panels for specific sets of users, specific requirements or specific locations. This includes adding features or enhancing features for machines without such features and creating distinctive multi-function or multi-feature operations where such operations did not previously exist.

It is an object of the present invention, therefore, to provide a new and improved user interface with the capability to selectively tailor the interface control panels and related screen dialog to meet expected job requirements. It is still another object of the present invention for an operator to provide customized control panels for a machine interface including creating and adding features to machines where previously non-existent. Still another object of the present invention is to provide a plurality of customized user interfaces selectively tailored to particular job requirements or machine users including control panels or templates customized from existing machines of multiple vendors or generically created by function or feature for any arbitrary job requirement. It is still another object of the present invention to provide a simple method to store and retrieve on demand predetermined control panels adapted to arbitrary job requirements. Other advantages of the present invention will become apparent as the following description proceeds, and the features characterizing the invention will be pointed out with particularity in the claims annexed to and forming a part of this specification.

SUMMARY OF THE INVENTION

The present invention is concerned with a method of storing and retrieving a customized interface control from a user display. The user display includes an array of pathway buttons and is interconnected to plural devices on a network. The method includes displaying and activating a job programming button to display programming options including save and save as options, engaging the save option to store the customized interface control in a general saved interface control category or store the customized interface control under a user defined reference. Included are techniques for expanding the features of selected machines on the network and creating selected multi-function operations not previously available.

BRIEF DESCRIPTION OF THE DRAWINGS

For a better understanding of the present invention, reference may be made to the accompanying drawings wherein the same reference numerals have been applied to like parts and wherein:

FIGS. 8A and 8B are screens illustrating improved customized control panels in accordance with the present invention While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention.

DESCRIPTION OF EMBODIMENT

Figure 1:
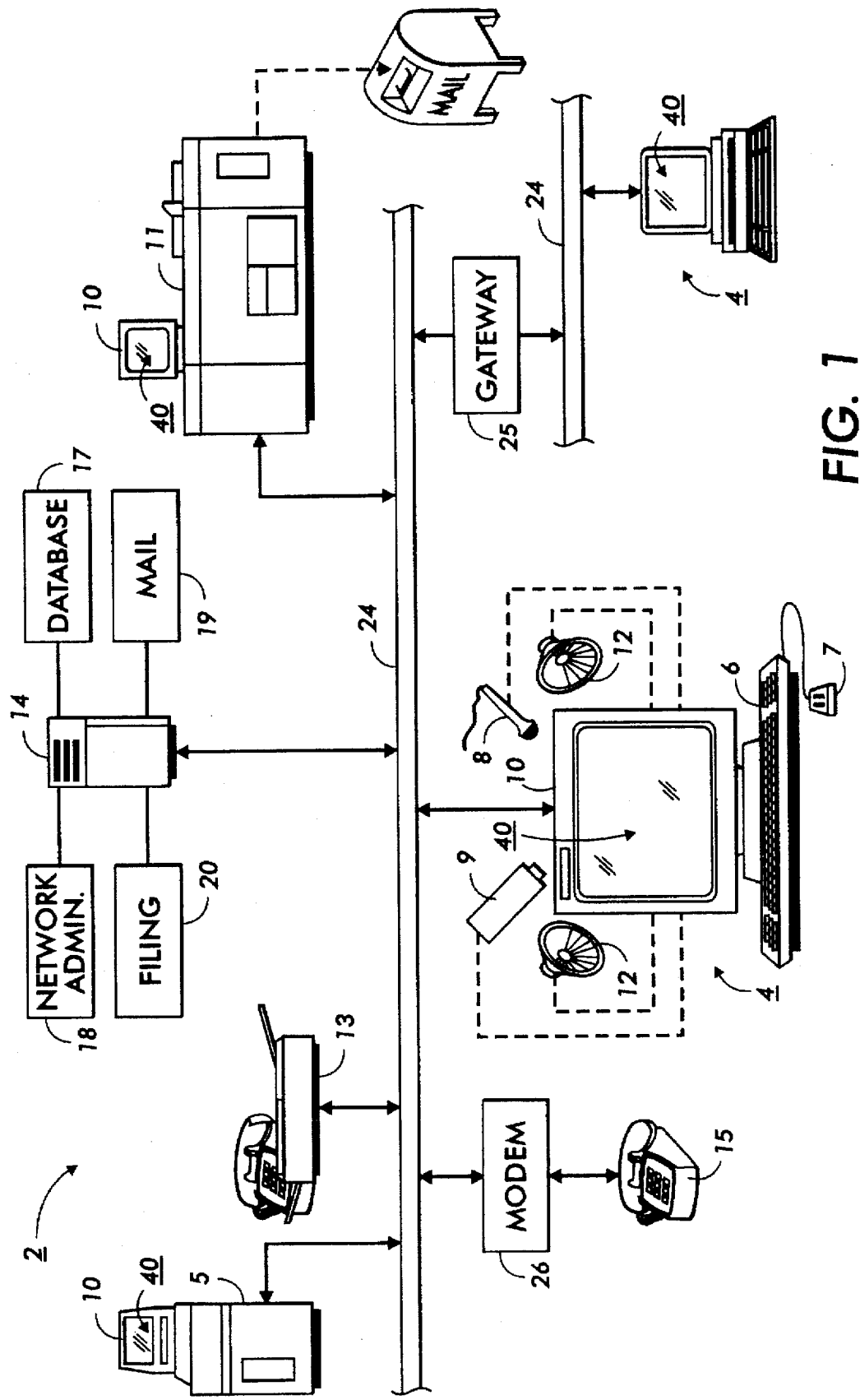
FIG. 1 is an illustration of a system environment incorporating the present invention.

Referring now to the drawings and in particular to FIG. 1, an exemplary multimedia device information system or network 2 including work station 4 enables users to communicate in a transparent and device independent manner. Multimedia system 2 can be implemented using a variety of hardware platforms and includes devices for input including scanner or digital copier 5, keyboard 6, pointing device or mouse 7, microphone 8, and video camera 9. The system further has devices for output including display terminal 10, printer 11, and speakers 12. Input/output (I/O) devices include facsimile 13, file server 14, and telephone 15. Server 14 is configured central to or remote from work station 4 with public, shared and/or private data storage that is differentiated by user access rights. The server 14 includes relational database system 17, network administration system 18, mail system 19 (e.g. e-mail, voice mail) and data storage and retrieval system 20, and can be physically configured using optical drives, hard drives, floppy drives and/or tape drives. The relational database system 17 provides systems with fast query and retrieval of data.

Work station 4 operates in a collaborative environment, where users at different Work stations 4 can work together in real time to process and distribute public, shared or private information existing in different forms. (Public data is defined herein as data accessible by anyone, shared data is defined as data accessible by a limited number of users and private data is data uniquely accessible by a single user.) Work station 4 can exist in a distributed or centralized environment. In either environment Work station 4 is connected to other systems and devices through local area network (LAN) 24, gateway 25, and/or modem 26. In distributed systems, a number of Work stations extend distributed processing and storage capabilities to each other, by providing for example redundant storage or a single mounting of a unique application. Work station 4 includes an object oriented user interface (UI) 40 that uses icons and windows to represent various data objects and user applications such as a display illustrating an office desktop metaphor employing various abstractions of a typical office environment. User interfaces using windows and icons having an object oriented methodology to present metaphors for maintaining data, navigating through various user spaces and presenting abstract computer concepts are well known, an example of which is Global View TM ("GV") software available from Xerox Corporation, which uses abstractions such as a desktop, inbasket, outbasket and documents.

Figure 2:
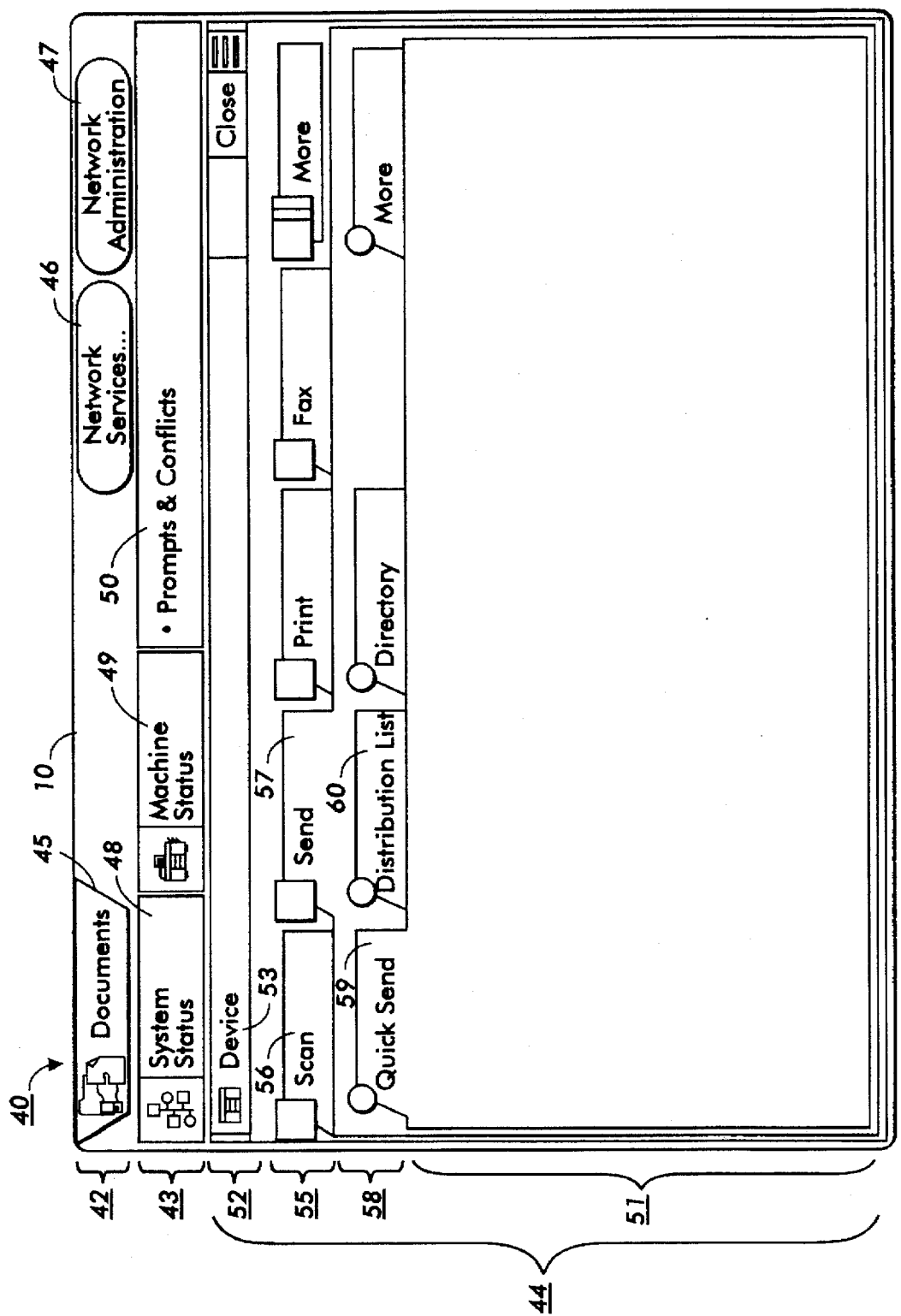
FIG. 2 is an enlarged view of a typical multi-device user interface for use on the display screens shown in FIG. 1.

FIG. 2 shows an embodiment of a multi-function device user interface 40 which is displayed on screens 10 of Work station 4, printer 11 and scanner 5. User interface (UI) 40 can operate remotely from any system; it is extensible across network services using remote windowing protocols such as X windows. For example, the user interface 40 on printer 11 is available remotely from any Work station 4 or alternate service such as scanner 5. Specifically, the user interface 40 is divided into three regions; resource bar 42, status bar 43, and service area 44. Resource bar 42 is a menu bar that provides users access to high level services that are integrated on network 24. Within the resource bar document source or suitcase 45 provides the user with a temporary storage space for documents. Suitcase 45 stores active and editable documents for easy movement across network services, or it is a transitional space where documents are stored while a user navigates through network 24.

Further, provided on resource bar 42 is network services menu 46 and network administration menu 47. Network services menu 46 provides access to any networked service such as printer 11, facsimile 13, scanner 5, file server 20 (private, shared and public file storage), database server 17, mail servers (e.g. voice mail, e-mail, etc.) 19, ports (such as modem 26, network gateway 25), and other Work stations 4. Also, available in services area 44 are published communications channels 63 available from network administration 18. These are channels that have been provided to a utility (not shown) that manages network administration 18. These channels included in a user profile are provided by a user who is to receive data from other users on network 24. Other utilities available in network administration 18 are distribution lists, service access lists and other domain and area network services. Network administration 47 provides users with access to utilities for identification and location of profiles and services. For example, network administration 47 includes information concerning user access privileges as well as resource privileges to file server access.

Status bar 43 is divided into three dedicated message areas, system message area 48, device message area 49, programming conflicts message and prompt area 50. Text is updated in the message area 50 as system status changes. The message area 50 can be selected to reveal more detailed messages. For example, when a printer is down, the message area gives a "Printer Down" message; further selection of the message area 50 provides more detail of causes for the printer to be down. Service area 44 groups and holds related services and features as well as provides user work space 51. A selected device is identified on herald menu 52, that is, cording on menu 52 provides utilities available to the device name 53. For example, device 53 could be a network publishing system with scanning, printing or faxing facilities. Device 54 would be the physical network publisher exporting the services. Service bar 55 groups services available on service 53. For example, a user could select a service module to access a specific document service (e.g. scan 56 or send 57). Service sub bar 58 provides access to sub-services within service modules. Workspace 51 provides a user area for preparing documents for distribution, which can include publication and archival.

Figure 3:
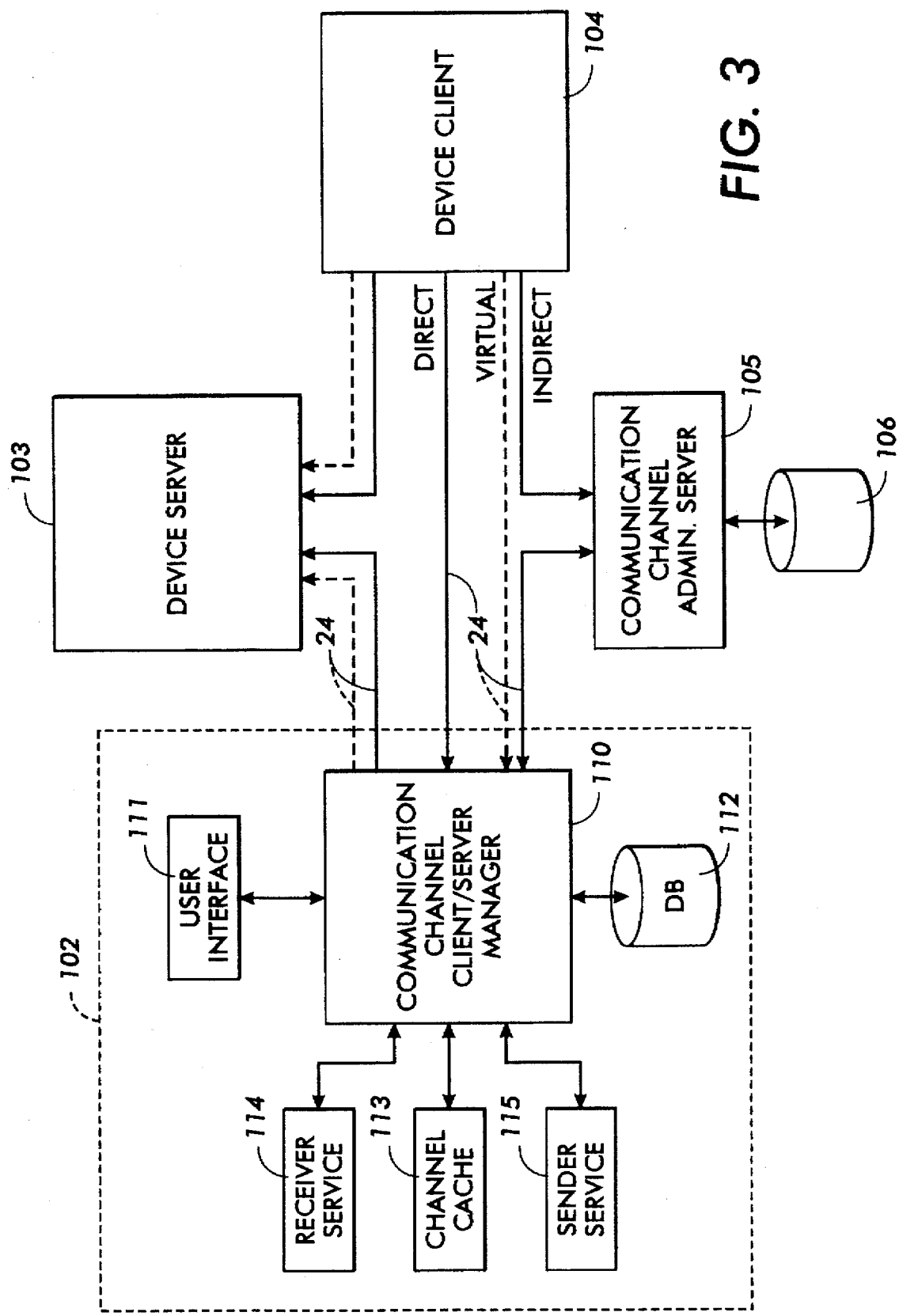
FIG. 3 shows a schematic view of a typical system architecture used in the system environment of FIG. 1.

The channel architecture is based on a client-server relationship, where client facilities are applications that are exported to the network 24, and server facilities are imported from the network. In other words, clients access exported server functionality. Thus, some services (printer, scanners, and the like) may only export or provide server functionality while using no client functionality. As a result, both the channel client and channel server may operate on the same service as well as uniquely on different services. The architecture is shown in detail in FIG. 3, where an integrated client/server system 102 is operating with stand alone client 104, server 103 and communication channel admin server 105 that provides network administrative facilities such as storing communication channel information on disk 106.

Common to both the client and server architecture is communication channel manager 110. Manager 110 interfaces user interface 111 with network 24, local storage disk 112 and cache 113, receiver service 114 and sender service 115. Local storage available to manager 110 is in the form of long-term storage 112 (e.g. disk, floppy or tape) and short-term fast access, or cache storage, 113. Receiver service 114 provides server functionality while sender service 115 provides client functionality to manager 110. For further detail of an exemplary system, reference is made to pending application D/92365, Ser. No. 07/130,929, incorporated herein.

As disclosed in pending application D/94101, U.S. Ser. No. 329,811 filed Oct. 27, 1994, incorporated herein, a feature library is used to assemble multifunctional user interface controls on dialog screens for fax machines, printers, and copiers, multifunctional devices, and workstations. The Feature Library allows an operator to easily assemble electronically an array of features to most effectively support many kinds of jobs. Customization is enabled via a scaled representation of a control panel, features added or deleted through simple on/off selectors, menus, and object drop and drag adjustable properties to change presentation styles and positioning of features. These dialog mechanisms enable different control panels to be created and used on the same product, and customers can easily devise their own customized control panels.

A multifunctional document system user interface (UI) will enable job programming for a variety of new tasks in document distribution, storage, retrieval, copying, and printing. Users often don't know how to best combine and use the features of a system. The Feature Library concept is an enabler for UI dialogs to address these needs, provide expandable customized solutions, and guide users on system uses. The Feature Library is included in an electronic UI dialog for the easy assembly of features on screens, to support any kind of job. This assembly is done before or after a product is in a customer site, by product developers or end users. Leveraging the flexibility of the electronic display medium, the complete array of possible multifunctional feature options are resident in software, but a useful subset of options are placed or removed from a particular job programming screen using simple object oriented methods.

All features in the electronic control panel layout are manipulable objects. They are retrieved, deleted, or moved electronically to compose job control screens. The arrangement and choice of feature categories are adjusted by dragging features across a reduced view of the final screen layout. Object properties associated with features and the layout are used to adjust presentation styles. One, or many of these control panels, once assembled, can be saved as a tailored solution for reuse to program jobs, and more than one control panel can reside on the same device for different needs. The Feature Library can be used to create unique multifunctional control panels to assist users with new applications and meet evolving needs.

Users check on or off any of a suggested feature set, or retrieve additional features from the menu. Checked features are added via animation to a scaled view. Features can be "unchecked" by users and deleted in the same manner. Features on a grid can also be selected with finger or mouse and dragged to new locations anywhere along the grid. Each feature has property options to define its display characteristics based on industry standards, or unique styles, as defined by product specifications. The property choices determines button types, etc, and the amount of grid space the feature will occupy on the lay out. In accordance with the present invention, multiple control panels are provided on the same device to tailor job set ups for different individuals, workgroup practices, and job types. Individual control panels can be named, saved, and shared across networks. These control panels, can be used "as is", or act as a blueprint for users to create their own job set up controls.

Operators are faced with a search task just to find the particular features they need for a given job on today's control panels and electronic dialogs. In the past, control panels simply added more menu layers to the electronic display, increased the number of categories of features, added more buttons, etc. to address feature growth. This has aggravated job set up complexity for users, and the problem is heightened when multifunctional features for fax, print, store, distribute are added. Users no longer know what features are available on the system, let alone how to combine them efficiently to set up a job.

In accordance with the present invention, an electronic display medium is used to organize the dialog's features into any number of self contained control panels, which contain subsets of features derived to meet the needs of different individuals, workgroup practices, and jobs types. The overall result is a dialog with greater simplicity, set up efficiency, and tailor ability. Users choose one of any number of control panels available on the system to set up a job. The multiple control panel concept is extended to great advantage for feature rich multifunctional system. Multiple standard control panels for a product can organize features to optimize user convenience for known kinds of tasks (e.g. a specific kind of original/source document, going from film slides to paper, or to achieve a special type of output such as addressed envelopes). Or these control panels can be used to build new user expectations about what the system can do (e.g.features for automatic transmission of a scanned and copied image back to a workstation, or electronic distribution using a copier). Pre-assembled control panels can be used "as is", or be blueprints for users to create and save their own versions. Users can combine features to create new functionality via a custom/blank control panel option. Custom, control panels can also be created at a workstation using these same tools or created on another device and sent for use elsewhere.

In one embodiment, available control panel options appear as named buttons on a main dialog screen. Users select any of the available control panel options, and if they wish to use the default settings they simply press start to begin the job, for one touch job programming. If a user chooses to change control settings, any of the control panel screens are opened by double selecting the option button. Users can then use the displayed control panel to program. Any displayed panel can also substitute for the main walk up screen if customers choose. Each control panel contains some of the same features found in other panels (such as paper supply and quantity) but can add or omit any other features. Also, a drop down menu is available from the window header bar to retrieve and add to the panel via a feature library-like listing, any other feature that might be needed by users on demand. Changes to layouts and settings may be saved.

Figure 4:
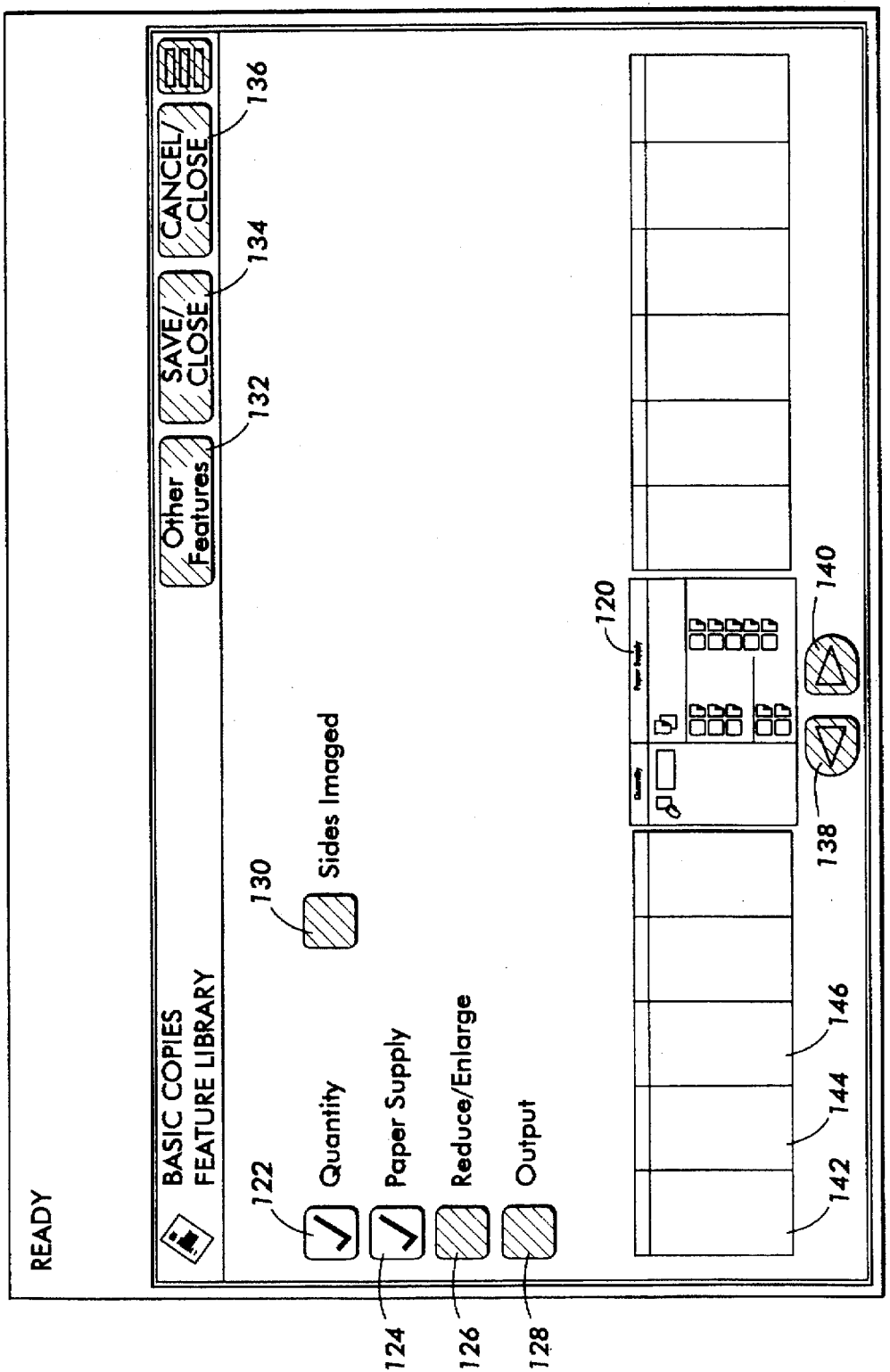
FIG. 4 illustrates a typical screen for customizing operator control templates.

With reference to FIG. 4, there is shown a typical screen display to enable an operator to customize operator controls. In particular, a feature or machine function library is made available to the operator to select and arrange a customized control by activation of a suitable create control panel or display feature library button. For example, the screen in FIG. 4 illustrates a quantity button 122, a paper supply button 124, a reduced/enlarged button 126, and output button 128 and a sides imaged button 130. These features can be selected in any suitable manner (such as highlighting) and positioned (such as moving or copying) on reduced display 120. The reduced display 120 is a scaled representation of an actual screen display that will appear on the screen of the interface. This scaled representation is available for the operator to receive selected features as desired. Features not shown on the screen display can be made available through another features button 132 providing additional menus of available features.

In one embodiment scroll buttons 138, 140 slide the reduced display horizontally along a plurality of panels as identified at 142, 144, and 146. For each panel a set of selected features can be inserted or received from the machine function library. For example, when reduced display 120 overlaps panel 142, panel 142 will receive the selected features and when reduced display 120 overlays panel 144, panel 144 will receive the selected features and so forth for each panel.

It should be understood that each panel, such as panels 142, 144 and 146 may not be visible on the full display screen at one time. Thus the various panels provide a virtual control panel that is selectively displayed by scrolling buttons 138 and 140. It should also be understood that the use of scroll buttons 138, 140 and panels 147, 144, and 146 is only one mode of creating a customized control and that the scope of the present invention covers any suitable method including full displays, partial displays, windows and menus of selecting and positioning icons and machine features to create a unique control panel or frame.

As shown, a save/close button 134 allows the operator to store the representation as arranged on reduced display 120 for future use. The cancel/close button 136 or any other suitable operation would cancel the customizing operation. Various memory slots are available to store and save the panel upon completion by the operator. In essence, the operator is provided with suitable control buttons to select and arrange various machine features to meet a given requirement. It should be noted that the screen of FIG. 4 illustrates only a few features and that many more features could be shown on the screen of FIG. 4 or on subsequent screens for selection by the operator and positioning on the scaled representation 120.

In accordance with the present invention, a user interface dialog for multifunctional devices may run on a device's local user interface or on a remote workstation or PC. On the remote PC or workstation, it may appear as a separate application or as a "transparent" application, that is, it may be triggered from inside another application in the same way that print drivers are triggered in currently available systems.

The difference between the technique of the present invention and print drivers is that print drivers are device-specific applications designed to submit print jobs while according to the present invention, there is a system level application designed to allow users to submit a variety of job types to a variety of types of devices, and also perform other system level tasks. This means that users can, in a consistent and simple way, interact with all the available devices and services available on a network.

Figure 5:
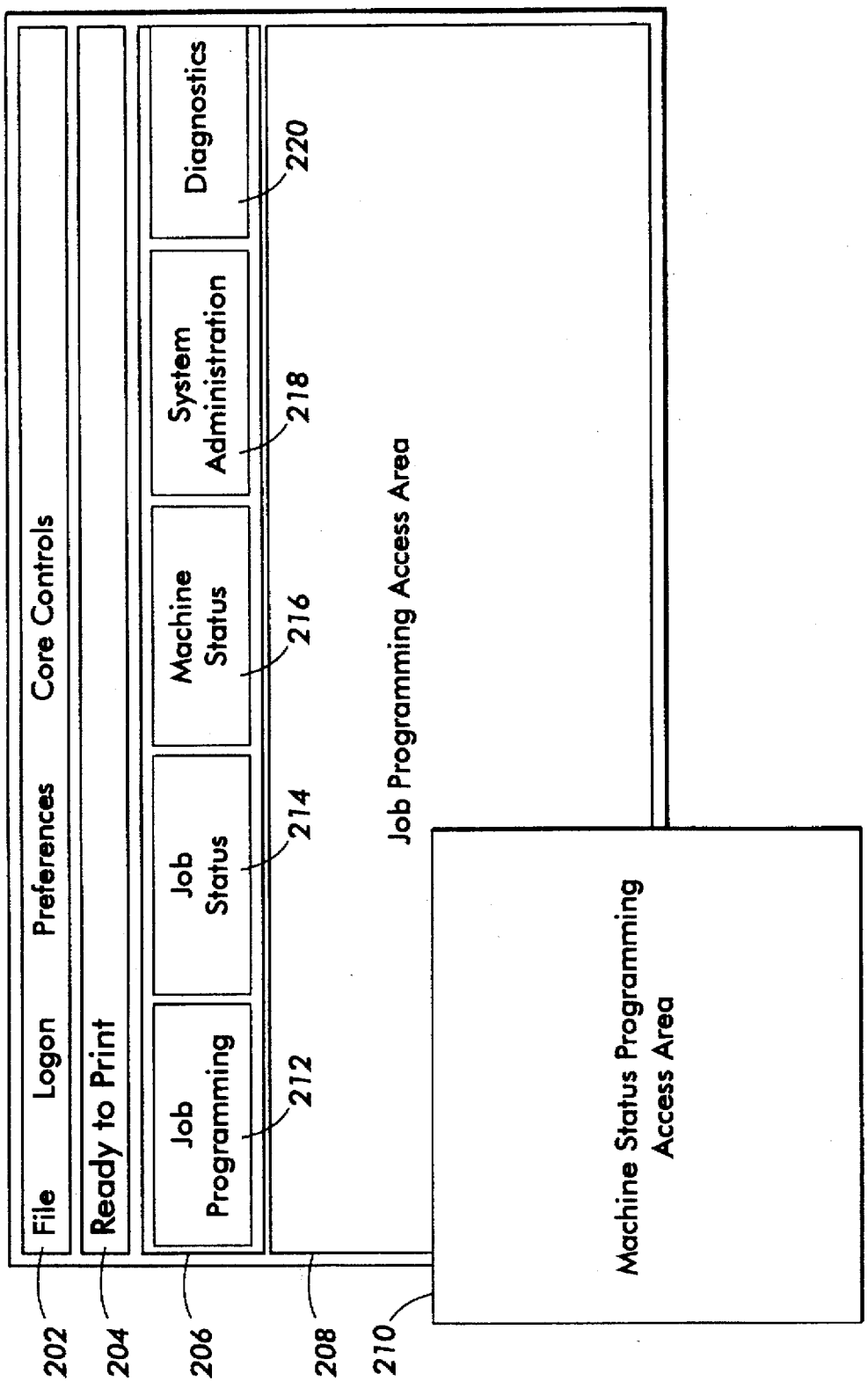
FIG. 5 illustrates the message areas, pathways and programming access areas for use of customized control templates.

The technique takes the industry standard conventions of message areas, pathways, and programming access areas and integrates them into a single, coherent unit, as illustrated in FIG. 5. Note that the entire system is reduced for the user to just 5 basic categories including pull down menus 202, message area 204, pathway button array 206, job programming access area 208, and machine status programming area 210. Each pathway has only one main focus for the user, thereby simplifying the task of learning and using the dialog. The main focus for each pathway is as follows: Job Programming 212: Control Panel, Job Status 214: Queue, Machine Status 216: Machine Mimic, System Administration 218, and Diagnostics 220.

A typical embodiment is a product employing a graphical user interface (GUI) to apply control templates. These templates may be used to control (and display information) about vendor networked and standalone multifunction and single function devices, and device independent document services. These control templates are a virtual control panel displayed as a part of a device UI dialog software application. They display various, user-specified combinations of features available 1) on vendor devices the UI dialog is currently referencing, 2) from any device independent software service or services available in the networked system and UI dialog is currently referencing, or 3) any combination of 1 and 2.

Figure 6:
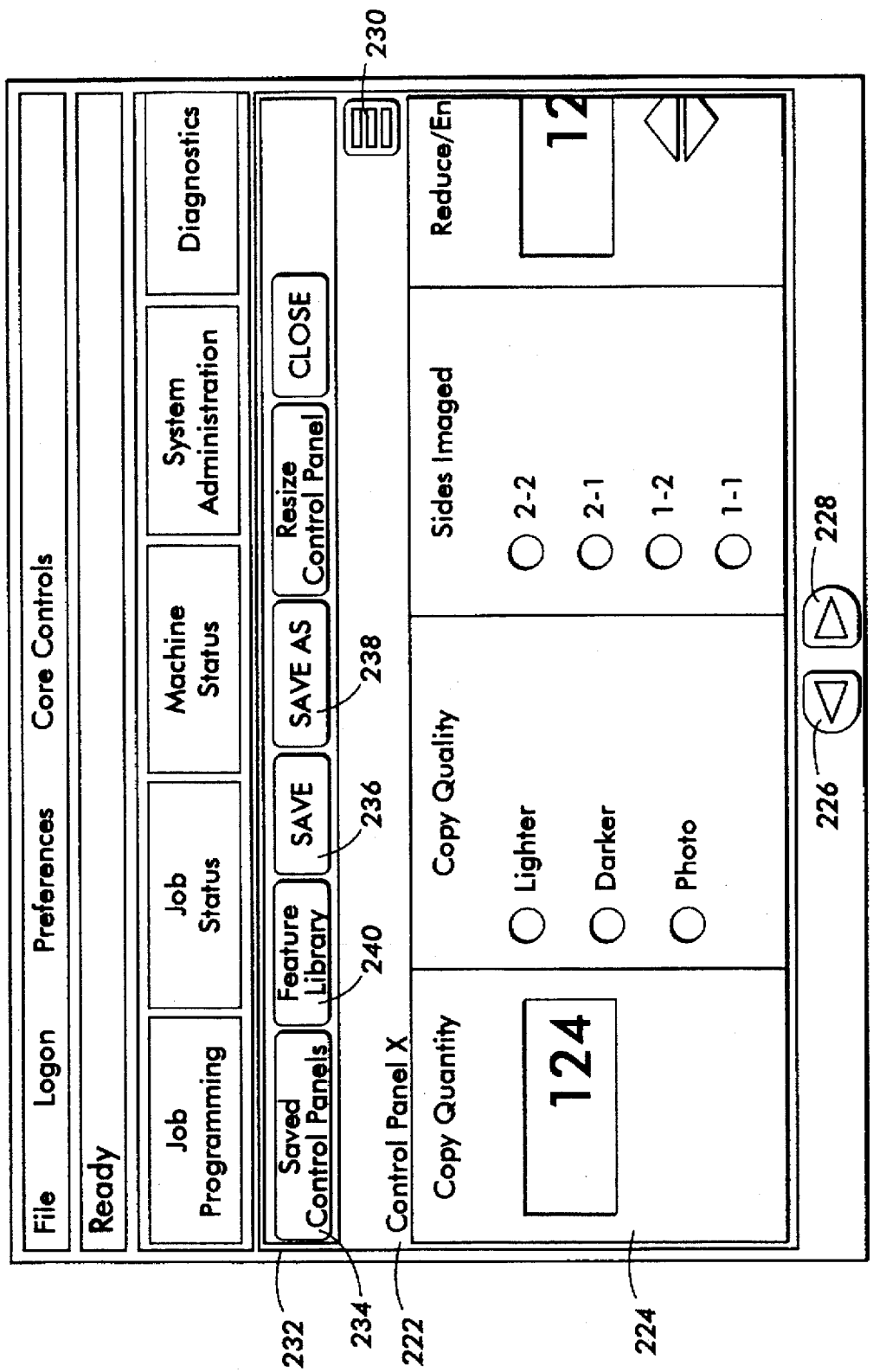
FIG. 6 shows a simulated screen image of the technique of save and retrieve of custom interface control panels in accordance with the present invention.

The features displayed in the control panel at any time are placed and positioned by the users of the system as required. One method to configure the control panel is described in pending U.S. Ser. No. 329,811 referenced above. Note, as shown in FIG. 6, that any number of features may reside in a control panel represented as control panel X 222. Features that don't fit on the screen 224 are layered to the right. Users access the layered features via the scroll buttons 226, 228 or via the selection menu 230 at the top right of the control panel 282 that lists all the features currently in the control panel. The feature selected by the user pops to the visible portion of the display. Note also the Tool Bar 232 above the control panel. The operations in this Tool Bar 232 refer specifically to the Job Programming context, in particular, note the Saved Control Panels 234, Save 236, Save As 238, and Features Library selections 240.

Template buttons on a User Interface allow users to save their job programming, embodied in virtual control panels or templates and recall the programming with a single button press. The Tool Bar in the Job Programming pathway contains button 234 that opens the Saved Control Panels window. In particular, this feature, called Saved Control Panels, allows users to store Control Panels for the user and also to distribute to others using the same system. When the user has configured the Control Panel as desired using a Feature Library the user may save it with a single button press (the "Save" and "Save As" buttons). Also, if a name is not already known, the system prompts the user for one. After a panel is saved, the user can recall the panel and all its features programming at any time with a single button press by selecting the panel in the Saved Control Panels window. In one embodiment, a set of basic Control Panels are provided. These can't be deleted or changed, but they can be copied for use as "starters" or templates from which users can build their own, new Saved Control Panels.

Figure 7:
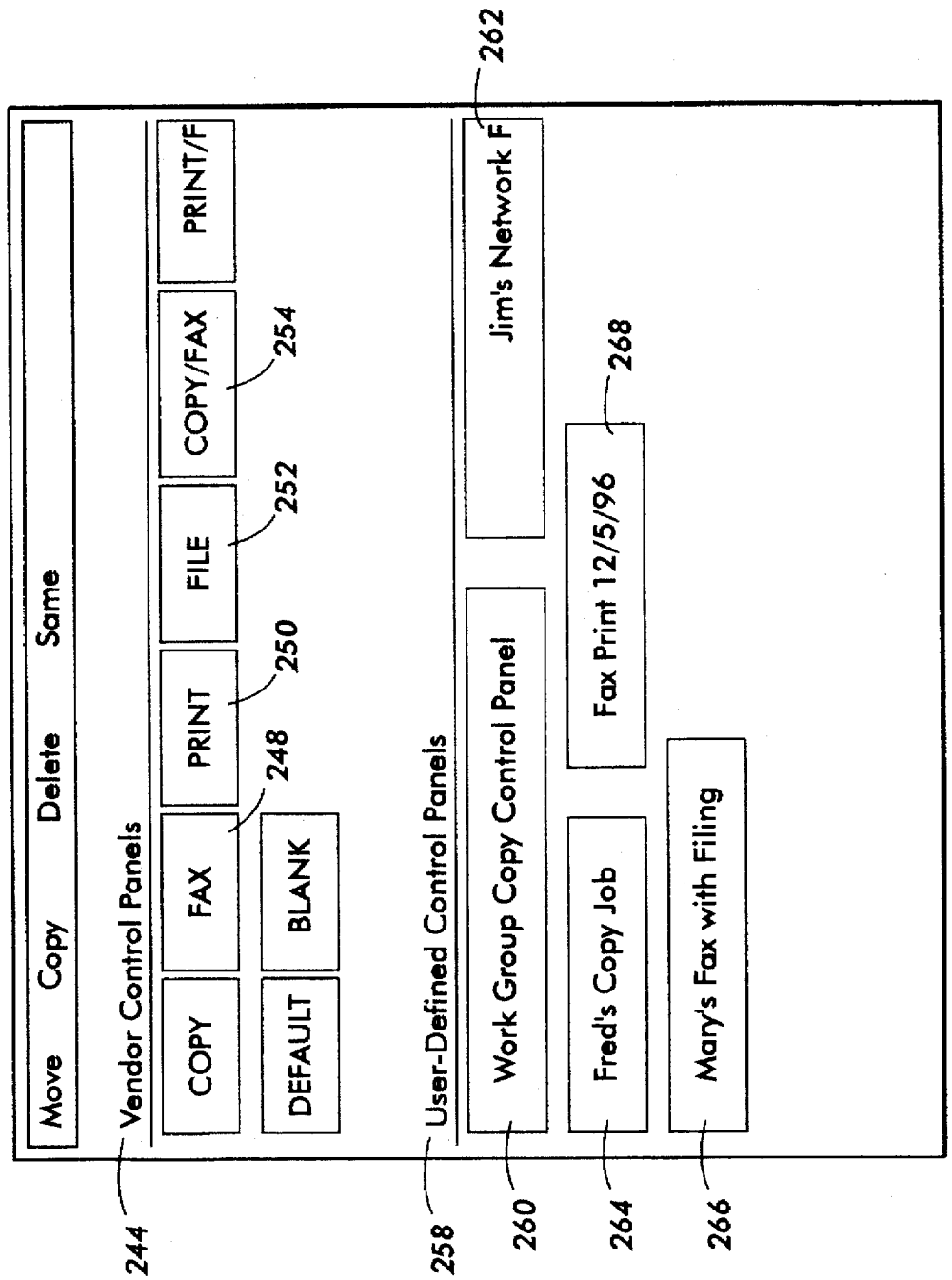
FIG. 7 illustrates a screen providing device intrinsic and user defined generic interface controls in accordance with the present invention.

The user adds or deletes features by selecting a Saved Control Panel. This selection retrieves that Saved Control Panel's features and programming into the window. The user can then program the Control Panel, that is, add and/or delete features from the Control Panel using the Feature Library. When this configuration activity is done, the user can select "Save" 236 in the Job Programming Tool Bar and the new programming is saved as a Saved Control Panel. FIG. 7 shows a number of buttons representing Saved Control Panels defined by users in this manner. These can be vendor specific or related panels 244 under various categories such as copy 246, fax 248, print 250, file 252 and copy/fax 254. The "Default" 256 saved Control Panel is used to define how the Control Panel looks when Clear All is selected or the system times out. It is configured in the same way as the other saved Control Panels. Other panels 258 can be more user defined such as a specific work group panel 260, or individual defined 262, 264, 266 or feature defined 268.

The Tool Bar at the top of the saved Control Panels window contains functions that apply only to the saved Control Panels context. Any of the saved Control Panels may be copied or moved (except certain defined and user defined saved Control Panels must remain in their own categories). Only the user defined saved Control Panels 258 may be deleted. To add or delete features, a Tool Bar in the Job Programming pathway contains a button that opens a Feature Library window. In particular, features, operations, and services provided by hardware and software vendors are provided. If a user is referencing certain devices or services, for example, a laser printer, then the features appear in the Feature Library. The user then has the opportunity to place the features in the virtual Control Panel and program those features. These settings can also be saved for later use.

In accordance with the present invention it may be possible to expand a device's features. For example, if the user wants a reduce/enlarge feature but the print driver doesn't enable that feature, the operator can add the reduce/enlarge feature from an alternate print service to the Control Panel, thus enabling the reduce/enlarge feature for the printer where it didn't previously exist. This functionality is enabled via the Tool Bar at the top of the feature library window. The Tool Bar contains three buttons that open windows as shown in FIGS. 8A and 8B, in particular, devices 272, services 274, and scripts 276. For example selecting "Services" 274 opens a window as shown in FIG. 8A that allows users to set which services are available to be programmed, independent of hardware, such as copy 278, print 280, and fax services 282. FIG. 8B shows the Feature Library configuration when devices 272 are selected in the "devices" window. Users may also select combinations of devices and services. In particular, features related to vendor #1 device 284 and vendor #2 device 286 are illustrated.

In the "Scripts" window, users can program work flow operations in a convenient way using various combinations of devices, services, and work practice objects. The user programs the features listed in the feature library by turning them on with toggle buttons (the X's in FIGS. 8A and 8B). This causes them to appear in the Control Panel where the user can program them as required.

As discussed above, there is disclosed a hierarchical method of creating, saving, and retrieving an interface control to a user display. The user display includes an array of pathway buttons, for example, a first level of options including job programming, job status and machine status buttons as well as system administration and diagnostics options. The job status option includes displaying job completion status data and the queue status for a given device. The machine status option provides machine status data for a given device on the network. Upon actuation of the job programming button, there is a display of a second level of programming options or buttons including feature library, save customized panel, resize control panel, and retrieve customized panel buttons. Upon actuation or engagement of the retrieve customized panel button, there is a display of a third level of programming options including customized panel for given devices. When the operator selects a customized panel for a given device on the network, a customized panel icon for a given device on the network is accessed from memory interconnected to the display.

It should be noted that the network devices include hardware devices such as printers, workstations, and personal computers and software devices. It should also be noted that specific control panels or templates can be saved for various vender devices and machines as well as for device independent services such as software services. Saving of a control panel can be to a general saved memory with pre-determined names or references or a control panel can be arbitrarily named and retrieved under such reference. In this manner, various options are available to the operator to store and retrieve custom templates. For example, some templates can be associated with a given device on the network. These templates or control panels can be locked or maintained as unchangeable with set references or names. Yet, these unchangeable templates can be the basis for creating additional control panels by copying and modifying the existing original unchangeable templates., These modified templates can receive suitable names to identify the customized nature of the template.

Of particular note is the capability when customizing a control panel to be able to add features to a machine not previously available. Thus, by access to, for example, a workstation or personal computer that can reduce or enlarge an image in proper format for driving a laser printer, an operator can incorporate this function into a control panel for a machine without reduction/enlargement capability. Thus, even though offsite or outside the machine, the machine can be treated as having this function. Through the machine does not have this feature, the customized panel will display this feature to the operator. Upon selection of the feature, the system will perform the reduction/enlargement at an appropriate device on the network before submitting to the designated device for printing. In essence, the machine without reduction/enlargement is programmed as if it had reduction/enlargement and the job is completed accordingly.

Reduction/enlargement can be considered a generic function or feature that can be performed somewhere on the network. If the feature provides a deliverable that is compatible to a given machine, then the given machine can be operated as if the feature is inherent. By altering the control panel, this feature can be presented to operators as part of the device. A typical generic feature is a software feature residing in memory on the network.

Further, as discussed above, there are various techniques for customizing control panels or templates. One method is to provide standard control template for devices on a network with feature indicators for selecting features inherent or specific to the device. A next level of control template is re-arranging the feature indicators of the standard control template specific to a given device into a modified standard control template. Another level of control templates is to provide a set of device independent or generic features that may or may not be incorporated into templates for a given device depending upon compatibility with the given device. The templates then are stored in memory on the network under suitable names for recall.

Features from the various levels can be combined in any arbitrary manner to create unique and customized control templates for any given requirement or situation. It should also be noted that by arranging and re-arranging icons and feature indicators on a virtual control panel, including reduction and enlargement of the panel and indicators, various presentations of a control panel can be provided. It should also be noted that multi-function features can also be arbitrarily created. This is accomplished by combining discrete features or functions into one icon or indicator to enable immediate multi-function operation with access to only one icon or function indication.

For example, two icons can be combined into a third icon wherein the first icon is a first printer icon and the second icon is a second printer icon. Engaging the third icon, for example, will then automatically transmit a job to both the first and second printers. In another example, the first icon is a printer icon and the second icon is a fax icon. Thus, a given job requirement can be simultaneously or automatically sent to both a printer and a fax machine with one operator designation. It is understood that various combinations of features and functions are thus available to an operator to customize a control panel or template.

While the invention has been described with reference to the structure disclosed, it is not confined to the details set forth, but it is intended to cover such modifications or changes as may come within the scope of the following claims.

We claim:

1. A method of customizing control interfaces for devices on a network comprising the steps of:

displaying a standard control panel for a given device with features, said control panel including a first icon to enable a first feature and a second icon to enable a second feature, the first icon being a first printer icon and the second icon being a second printer icon, combining the first icon and the second icon into a third icon, said third icon accessing both the first and second features, and incorporating the third icon on the control panel to provide a modified control panel whereby the first and second features are concurrently enabled by the third icon.

2. The method of claim 1 including the step of displaying a new icon representing a feature unavailable on the standard control panel and incorporating the new icon into the standard control panel to provide a modified control panel.

3. The method of claim 2 including the step of activating the new icon to provide the given device with said feature.

4. The method of claim 2 including the step of storing the modified control panel in memory.

5. The method of claim 4 including the step of accessing the modified control panel in memory.

6. A method of customizing control interfaces for devices on a network comprising the steps of:

displaying a standard control panel for a given device with features, said control panel including a first icon to enable a first feature and a second icon to enable a second feature, wherein the first icon is a printer icon and the second icon is a fax icon, combining the first icon and the second icon into a third icon, said third icon accessing both the first and second features, and incorporating the third icon on the control panel to provide a modified control panel whereby the first and second features are concurrently enabled by the third icon.

7. The method of claim 6 including the step of displaying a new icon representing a feature unavailable on the standard control panel and incorporating the new icon into the modified control panel.

8. The method of claim 7 including the step of activating the new icon to provide the given device with said feature.

9. The method of claim 8 including the step of storing the modified control panel in memory.

10. The method of claim 9 including the step of accessing the modified control panel in memory.

* * * * *